Aug. 5, 1952     D. B. LUTEN, JR     2,606,146
HIGH-VACUUM MULTISTAGE DISTILLATION METHOD AND APPARATUS
Filed June 26, 1948     3 Sheets—Sheet 1

INVENTOR:
DANIEL B LUTEN, JR.
BY Oswald H. Milmore
HIS ATTORNEY

Patented Aug. 5, 1952

2,606,146

UNITED STATES PATENT OFFICE 2,606,146

HIGH-VACUUM MULTISTAGE DISTILLATION METHOD AND APPARATUS

Daniel B. Luten, Jr., Berkeley, Calif., assignor to Shell Development Company, San Francisco, Calif., a corporation of Delaware Application June 26, 1948, Serial No. 35,340

7 Claims. (Cl. 202—205)

This invention relates to the art of high-vacuum distillation, and, more particularly, a distillation method and to distillation apparatus wherein vaporization is effected from a liquid flowing as a film over a warm surface (the liquid constituting the film being herein referred to as the distilland) and the resulting vapors pass through an evacuated space to a cold surface on which condensation or all of a major portion of the vapors is effected. Such distillation is, in certain forms involving passage of the vapors through a short, unobstructed path between the warm and cold surfaces, also known as "molecular distillation." The present invention, while intended for molecular distillation technique, is not restricted to operations which achieve true molecular distillation conditions, but may be applied to near-molecular operating conditions as understood in the art, e. g., wherein the vacuum is insufficiently low or screens or the like are placed in the path between the warm and cold surfaces so that this path is not quite unobstructed, or wherein condensation is effected on a plurality of cold surfaces arranged in a series, etc. The invention is, however, restricted to operation involving condensation of the vapors on a separate, colder surface, and operations of this type will herein, for the sake of brevity, be designated as high-vacuum, surface-condensation distillations.

Such high-vacuum, surface-condensation apparatus are, in the conventional forms, not readily adaptable for fractionation, i. e., for repeated re-distillations wherein distillate is flowed as reflux from stage to stage, and it is for this reason customary to employ a series of such high-vacuum, surface-condensation stills, interconnected in accordance with some scheme for achieving fractionation, when it is desired to effect separations of a higher order than can be effected by one stage. (See U. S. Patents Nos. 2,073,202 and 2,128,223.) According to a proposal of Hickman (U. S. Patent No. 2,234,166) internal reflux is attained by gravity flow from an inner, stationary condensing surface onto an outer, spinning, frusto-conical evaporating surface; such an arrangement, although useful in certain instances, is not readily adapted for forced feed or accelerated flow of the condensate, and imposes certain limitations on the design of the still, e. g., it does not permit the independent selection of the rates of reflux, rate of flow of the distilland, and the heights of the stages. Moreover, the diameter of the vaporizing surface becomes unduly great when more than a very small number of stages are used, resulting in a large, inconvenient rotor and tending to form dry spots on the vaporizing surface.

This invention has for its object the provision of an improved method and apparatus for high-vacuum, multi-stage, surface-condensation distillation wherein the distilland and the condensate (or distillate) are flowed through a succession of stages in a manner to provide reflux of the distillate internally of the still, such reflux being effected by centrifugal force.

A further object is to provide a high-vacuum, multi-stage, unobstructed path distillation apparatus and method for vaporizing the more volatile constituents of a distilland from a moving or stationary warm surface and condensing vapors thus formed on a moving, cold surface arranged to transfer the resulting condensate to the warm surface of a different stage, for vaporization of at least a part of such condensate in said other stage together with distilland from said other stage or from a preceding stage.

Another object is to provide an improved high-vacuum, unobstructed path distillation apparatus and method wherein the condensate is made to rise within a stage and is transferred to another stage by centrifugal force made effective by revolving an upwardly diverging, frusto-conical condensing surface on which the vapors are condensed and on the outer surface of which the condensate is made to rise.

Still another object is to provide an improved high-vacuum distilling apparatus of the surface-condensation type comprising a plurality of outer stationary or moving evaporating surfaces so arranged with respect to each other than unevaporated distilland or liquid residues, i. e., refluxing liquid, will pass generally downwardly within the apparatus from the $n$th to the $n+1$th stage, etc., to the last stage (passing either downwardly or upwardly within any one stage, along the outer surface), each of said outer surfaces having facing it an inner, cold, rotating condensating surface, with means for causing the condensate collected on said cold surface to ascend and to be transferred from the $n$th to the $n-1$th stage, etc., upwardly.

These and other objects, which will become apparent from the following description, are attained according to this invention by flowing the distilland along an outer, annular heated surface (which may be stationary or revolving, and which may be cylindrical or made up of a series of frusto-conical sections), and transferring the portion of the distilland remaining unevaporated after passage through one stage to the succeeding stage. The vapors flow generally radially inwardly across an annular, highly evacuated space and are for the most part condensed on a cooled, rotating condensing surface formed as an inverted frustrum of a cone, i. e., diverging upwardly. The condensate collects as a film on the cooled surface and is given a centrifugal force due to the rotation of the surface. This force is counteracted by centripetal force normal to the surface (radially inwardly and upwardly) due to surface tension. The resultant of these forces causes the film of condensate to travel upwardly along the surface until it reaches the top of its distillation stage, from where it is transferred to another stage and commingled with distilland; this commingling may take place on a heated surface of the new stage, or in a separate mixing stage, as desired. According to a modified form of the invention, the centripetal force is made effective at least a part by providing gutters on the condensing surface, such an arrangement being desirable particularly when the ascending film of condensate has too low a surface tension or is too thick to be retained on the cooled surface by surface tension alone.

The invention will be better understood by reference to the accompanying drawings forming a part of this specification and illustrating certain preferred embodiments of the invention, it being understood that these embodiments are merely illustrative of certain apparatus in accordance with the invention and not restrictive of the scope of the invention.

Figure 1:
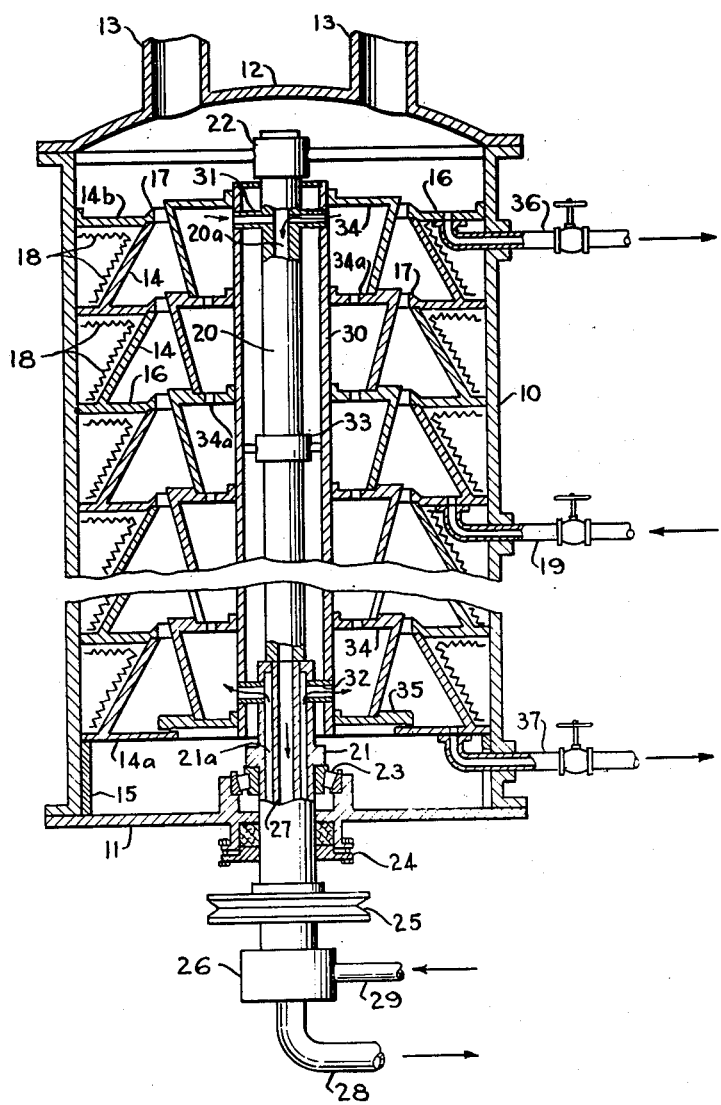
Fig. 1 is a vertical, sectional view of a still adapted to effect fractionation with high-vacuum, surface condensation in accordance with the invention.

Referring to Fig. 1 of the drawing in detail, 10 designates a cylindrical casing having a gas-tight bottom 11 and a gas-tight lid 12. Evacuating conduits 13 in the lid are connected to a suitable source of high vacuum (not shown). A series of outer, annular sections 14, having frusto-conical walls, are fixed within the casing 10, the inner surfaces of these sections forming the hot vaporizing surfaces and subdividing the still into stages. For convenience in assembling these sections may be formed separately to nest as shown. The lowest section 14a has an outer cylindrical flange for making a seal against the casing wall and is supported by a spacer ring 15. Each section provides an annular, horizontal shelf or tray 16 at the base or widest portion of the frusto-conical surface, and is provided with an integral annular dam or weir 17 at its radially inner edge. Residence time of distilland can be controlled by selection of the weir height. The lowest section 14a has a rim at its inner edge which does not function as a weir. The uppermost section 14b is incomplete in that it has a tray but no frusto-conical wall; it is provided with an outer cylindrical flange forming a seal against the casing wall, and forming an outer rim for retaining liquid on the tray. The trays 16 and frusto-conical walls may be heated in any desired manner, for example by electric heating elements 18. When such heating elements are used it is not essential that the annular sections be sealed with respect to each other or that the lowest and uppermost gas-tight manner. However, if a heating fluid is to be circulated in the spaces behind the vaporizing walls these joints should be sealed, for example by providing gaskets or by welding.

Liquid to be distilled may be fed into any stage of the still, either at the top, bottom, or at an intermediate stage, depending upon the composition of the feed material and the fractionation to be effected. In the embodiment shown, feed material is introduced through a valve-controlled supply pipe 19 to the tray of an intermediate stage.

The condensing surface is formed by a rotor, arranged within and, preferably, concentrically within the sections 14. The rotor comprises a composite vertical shaft having upper and lower sections 20 and 21, respectively, journalled at the top in a sleeve bearing 22 and at the bottom in a tapered roller bearing 23. The lower section 21 is welded to the upper section 20, and is sealed against the bottom 11 by a suitable packed, gas-tight gland 24; it carries a pulley 25 by means of which it may be rotated. The lower end extends into a casing 26. The upper section 20 has a central bore 20a extending from a point near the top and opposite to the uppermost stage, communicating with a pipe 27 fixed to the lower section 21 and extending downwardly through a larger bore 21a therein. The casing 26 is provided with a suitable gland and flow arrangement for placing the pipe 27 into flow communication with discharge conduit 28 and placing the annular portion of the bore 21a surrounding the pipe 27 into communication with the supply conduit 29.

A cylindrical tube 30 is fixed to the shaft 20—21 by means of radial tubes 31 at the top and radial tubes 32 at the bottom, and one or more intermediate collars 33 with solid radial arms. The tube carries a plurality of rotor sections 34, corresponding in number to the sections 14—14a. The sections are of identical construction (except for the upper perforations 34a) and provide outer, inverted frusto-conical walls, the outer surfaces of which form the condensing surfaces. The sharp, upper edge at the widest portion of each rotor is slightly above the top of the nearest weir 17 of the stationary sections 14. Each section has an upstanding rim or flange engaging the tube 30, to which it may be secured by screws, welding, etc. The upper walls carry outer, annular raised portions to permit nesting of the successive sections, as shown. Each wall except that of the uppermost section has perforations 34a providing communication for the flow of a cooling fluid. An annular plate 35 seals off the bottom of the lowest section and has an outer depending rim extending over the inner rim of the section 14a, but rotatable with respect thereto. Since the space within the casing 10 and within the tube 30 is to be maintained at a high vacuum, while the bore of the shaft 20 and space outside of the tube 30 and inside of the sections 34 is to be maintained at a somewhat higher pressure (to permit circulation of a cooling fluid) the several sections 34 and plate 35 should be sealed with gas-tight seals with respect to each other, and the inner, upstanding flange at least on the uppermost section and on the plate 35 should be similarly sealed to the tube 30. This may be effected, for example, by welding the composite rotor and lowering it into the casing 10.

Condensate or distillate may be withdrawn from the uppermost tray 16 through a valved discharge conduit 36, and distillation residue from the lowest tray 16 through a discharge conduit 37. These may be provided with discharge pumps (not shown).

In operation, the rotor is revolved rapidly and the casing 10 is placed under a high vacuum, e. g., to attain an absolute pressure of a few millimeters of mercury, or at a pressure of less than 1 mm., such as, for instance, 0.1–0.001 mm., by applying vacuum to the lines 13. Cooling fluid is circulated through supply conduit 29, flowing thence through annular space 21a, outwardly through tubes 32, up through the successive sections 34, inwardly through tubes 31, downwardly through bore 20a and pipe 27, and out through discharge conduit 28. The frusto-conical and horizontal walls of the sections 14 are heated by heaters 18. Liquid to be distilled is supplied through supply 19 and is heated thereon, a portion vaporizing therefrom and the excess overflowing the weir 17 and descending by gravity as a film along the heated frusto-conical surface. Due to the high vacuum and the temperature, volatile constituents are vaporized and move away from this descending film. The unevaporated distilland is collected on the tray 16 immediately beneath as a shallow pool, from which additional evaporation and overflow take place. In this manner the distilland traverses successively the several vaporizing sections or stages. The final, unvaporized residue is withdrawn from the lowest tray via conduit 37.

Within each stage a major portion of the vaporized material is condensed on the nearest condensing surface, i. e., on the outer surface of the nearest revolving section 34. The condensate forms a thin film on the cooled surface and is retained therein by surface tension. The centrifugal force resulting from the rotation causes the condensate film to move upwardly along the cold surface until it reaches the widest portion. There it is discharged tangentially, moving over the nearest weir 17 and dropping onto the corresponding tray 16, wherein it is mixed with distilland entering the tray from the next higher vaporizing surface. To maintain vaporizing liquid on the hot surfaces above the stage into which the feed liquid is supplied it is necessary to provide reflux; this may be provided by throttling the valve in the conduit 36 to withdraw only a portion of the material discharged onto the uppermost tray 14b. However, it is also possible to introduce reflux from an outside source, such as a surge tank.

Figure 2:
Fig. 2 is a fragmentary elevation view of a modified form of the rotating condensing surface.
Figure 3:
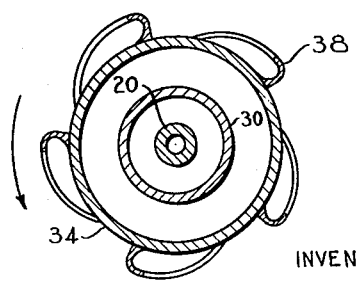
Fig. 3 is a transverse sectional view taken on line 3—3 of Fig. 2.

Referring to Figs. 2 and 3, inclined gutters 38 may be provided on the outer surface of the condensing sections 34, the rotor being assumed to rotate in the direction indicated by the arrows. These gutters collect the condensate and lift it, somewhat in the manner of a screw lift. Upon reaching the top of a section 34 the condensate is flung tangentially outwardly onto the nearest tray 16. It will be noted that the gutters have their concave surfaces leading, i. e., disposed toward the direction of travel.

As previously indicated, it is also possible to heat the vaporizing surface by means of a heating fluid, and/or use a rotating vaporizing surface, so as to effect a controlled rate of the distilland. A still embodying both of these features is illustrated in Fig. 4, which shows only a few of the intermediate stages of the still, it being understood that the shaft may be mounted for rotation and for feeding and discharging heating and cooling fluids by a construction of the type described in detail in connection with Fig. 1.

Figure 4:
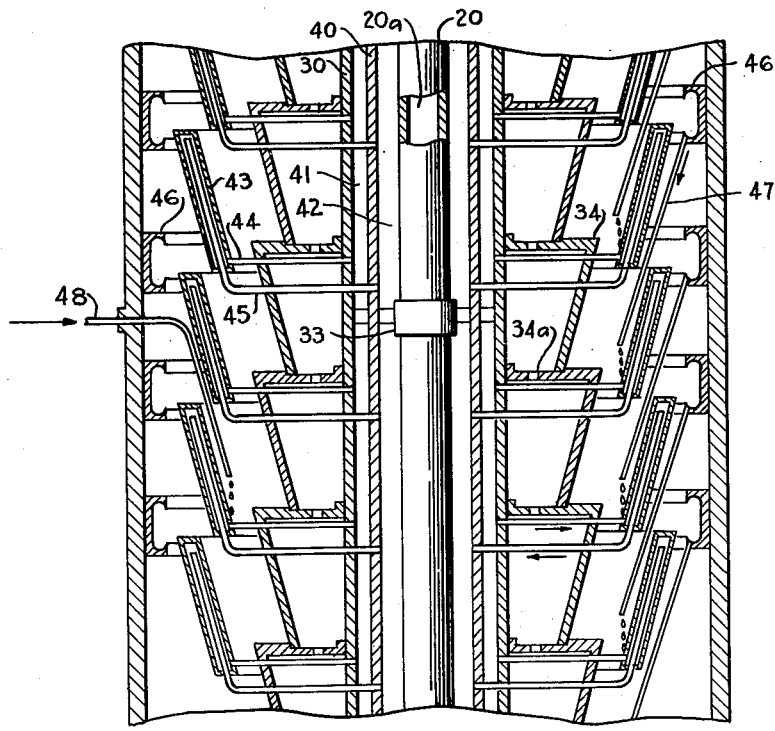
Figs. 4 and 5 are fragmentary, vertical, sectional views of two modified forms of stills according to the invention.

In Fig. 4, the rotor shaft 20 has a bore 20a for cooling liquid and carries two concentric tubes 30 and 40. The sections 34 of the cooling sections are fitted to the tube 30 and are provided with ports 34a for circulation of cooling fluid, as in Fig. 1. The annular spaces 41 and 42 between tubes 30 and 40, and between tube 40 and shaft 20, respectively, are, however, sealed off for the circulation of heating fluid.

The vaporizing surface is formed of inverted, frusto-conical, hollow sections 43 mounted on and rotatable with the cooling sections. These upwardly diverging vaporizing sections may be supported by any structural elements, for example, by means of radial pipes 44 and 45. The pipes 44 interconnect the annular space 41 with the bottom of each hollow space within the sections 43, and serve to supply heating fluid to the vaporizing sections. The pipes 45 interconnect the annular space 42 with the top of each hollow space and serve to return heating fluid from the vaporizing sections. The lowest, narrowest portion of each vaporizing section extends slightly below the uppermost, widest portion of the corresponding cooling section 34.

The outer casing 10 carries stationary annular gutters 46 for collecting unvaporized distilland from the top of each vaporizing section. Each gutter is provided with one or more downspouts 47 for discharging liquid from the gutter onto the vaporizing surface of the next lower stage. The downspouts 47 are stationary and their lower ends are located so that liquid dropping down will fall on the rotating vaporizing surface a short distance above the bottom of the vaporizing section.

Material to be distilled may be introduced into any stage of the still, either an end stage or an intermediate stage, e. g., through a feed conduit 48.

In operation, the rotor is revolved, the casing 10 is evacuated, and cooling fluid is circulated, as described for Fig. 1. Heating fluid is supplied upwardly through the annular space 41 and the radial pipes 44 to the spaces within the hollow vaporizing sections 43, and is then discharged through the pipes 45 and the annular space 42. The distilland forms a thin film on each vaporizing surface and rises due to centrifugal force. Volatile constituents are vaporized from the distilland and are condensed on the sections 34, and unvaporized distilland, upon reaching the top of a vaporizing section, is flung tangentially outwardly into the nearest gutter 46. From there it is conveyed by the downspout 47 to the next lower stage. The condensed volatile material rises on the outer condensing surface of the sections 34 and, upon reaching the uppermost edge, is flung tangentially outwardly onto the bottom of the vaporizing surface of the next higher stage. Distillation residue and distillate are eventually withdrawn from the bottom and top of the column, respectively, as described for Fig. 1, for example through conduits communicating with the nearest gutters 46.

It should be noted that by proceeding in the manner just described distillate is transferred from the $n$th stage to the $n-1$th stage, where it is commingled with distilland residue transferred through a downspout from the n—2th stage to the n—1th stage. A flow relationship of the type employed in conventional fractionation is, therefore, achieved.

As before indicated, the embodiment shown in Fig. 4 is merely illustrative, and subject to modifications. Thus, instead of providing hollow vaporizing sections heated by a heating fluid, simple thin-metal frusto-conical sections heated by radiant heat, e. g., electric elements such as the elements 18 of Fig. 1, may be employed.

Figure 5:
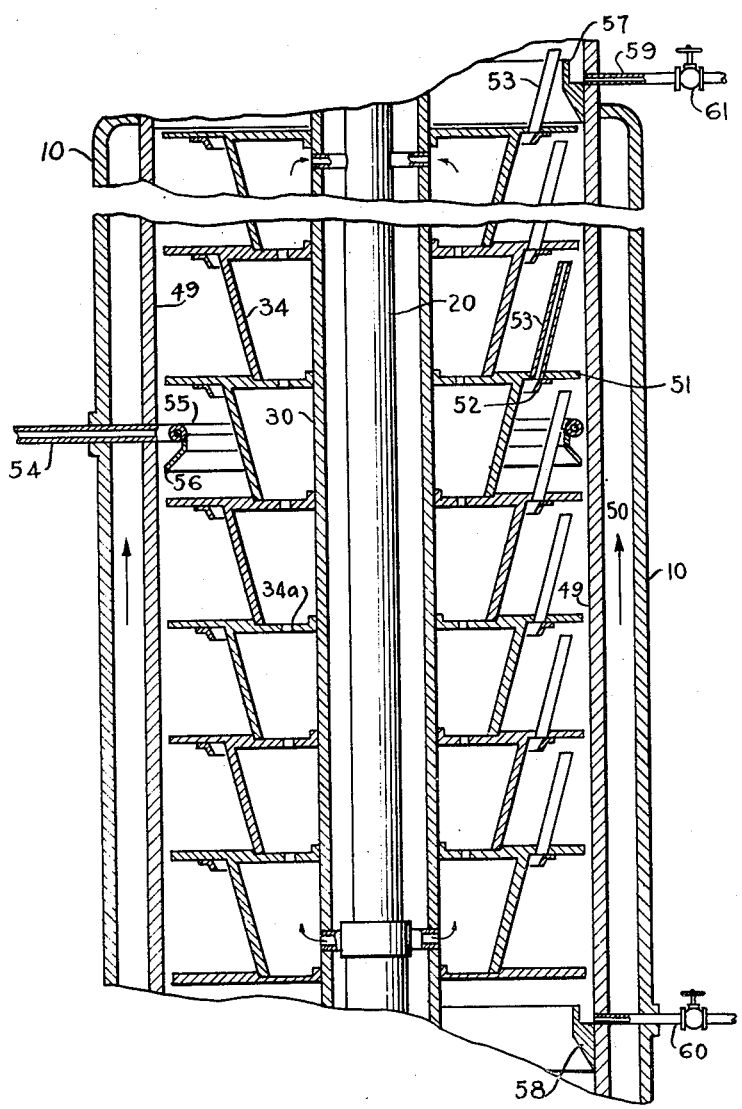

According to still another embodiment, shown in Fig. 5, the vaporizing surface is the inner face of a stationary wall 49 carried by and spaced from the casing 10 to provide an annular space 50 through which heating fluid is circulated upwardly. The rotor comprises a hollow shaft 20, cylinder 30, and cooled, inverted frusto-conical condensing sections 34, as before. The sections 34, however, have annular isolating shields 51 extending from the widest part, to which annular gutters 52 are fixed. Each shield carries one or more upwardly and outwardly inclined upspouts 53 communicating with the top of the gutter and terminating near the vaporizing surface, just beneath the next higher isolating shield 51 and, hence, near the top of the next superior stage. Liquid to be distilled may be introduced at any stage of the still, for example, through a supply pipe 54 connected to an annular, perforated distributing pipe 55 having a deflector 56. Liquid issuing from the perforations of the pipe 55 by gravity are directed toward the cylindrical vaporizing surface to form a film thereon. The pipe 55 is spaced from the vaporizing surface to avoid obstructing the downward flow of distilland from higher stages. Gutters 57 and 58 at the top and bottom permit condensate and distillation residue to be withdrawn via conduits 59 and 60. Reflux is provided by throttling valve 61.

In the embodiment according to Fig. 5 the vaporizing surface is continuous, but may be regarded as comprising a plurality of stages, the boundaries of which are fixed by adjacent isolating shields 51. In operation, the casing 10 is evacuated, the rotor is placed in motion, and heating and cooling fluids are circulated as previously described. Distilland flows down the vaporizing surface from stage to stage. Within each stage a portion of the distilland is vaporized and major portion thereof condensed on the condensing surface of the respective section 34, whereon it moves upwardly as a film. Upon reaching the top of a section 34 it is discharged into the gutter and moves from there upwardly through the upspout 53, impelled by centrifugal force. From the top of the upspout the condensate is discharged tangentially against the vaporizing surface near the top of the next higher stage, being there commingled with unvaporized distilland from the stage above that. It will be noted that condensate from an $n$th stage is commingled with unvaporized distilland from the $n-2$th stage, as previously described.

The condensing sections 34 according to Figs. 4 and 5 may be modified as shown in Figs. 2 and 3.

It is obvious that, by the arrangement described in this specification, it is possible to select the areas for the several vaporizing surfaces to accommodate the distilland at the respective sections, for example, by making different condensing sections and/or vaporizing stages of different diameters.

I claim as my invention:

1. Fractional distillation apparatus comprising a substantially vertical tubular member having an inner vaporizing surface, means for forming a film of distilland on said surface, means for heating said surface, a rotor shaft within said tubular member substantially co-axial therewith and having a bore communicating to the outside of the tubular member, a plurality of thin-walled condensers spaced from said shaft to provide flow spaces for the flow of cooling fluid and rotatable with the shaft, said condensers being distributed over the major portion of the length of said tubular member, each condenser having an outer condensing surface that extends upwardly and outwardly from the axis of the shaft, means for rotating the shaft to throw condensate upwardly and toward said vaporizing surface by the resultant centrifugal force and interfacial tension, a substantially horizontal annular wall surrounding said shaft between each adjacent pair of condensers for separating said flow spaces from each other, said walls having openings interconnecting said flow spaces in a series for the flow of cooling fluid successively through said flow spaces, a communicating passageway between the bore of the shaft and a flow space near one end of the shaft, conduit means concentric with said shaft and isolated from said bore communicating with the flow space near the other end of the shaft and with the outside of the tubular member, and means for circulating cooling fluid from the outside of the tubular member through said bore, flow spaces and conduit means and thence to the outside of the tubular member.

2. Fractional distillation apparatus comprising a substantially vertical tubular member having an inner vaporizing surface, means for forming a film of distilland on said surface, means for heating said surface, a rotor within said tubular member substantially co-axial therewith having condensing means distributed over the major portion of the length of said tubular member and having a surface rotatable with the rotor and extending upwardly and outwardly from its axis, an inclined gutter on said condensing surface, and means for rotating the rotor to lift condensate and throw condensate toward said vaporizing surface by the resultant of centrifugal force, interfacial tension and the action of said gutter.

3. A high-vacuum, unobstructed path, fractional distillation apparatus having a series of superposed stages comprising an outer, downwardly-divergent, frusto-conical wall in each stage forming a vaporizing surface on the inner face thereof, an annular, substantially horizontal tray joining the top of each of said walls with the bottom of the wall of the next higher stage, arranged to cause distilland to traverse successive stages in sequence by flowing downwardly as a film along each frusto-conical vaporizing surface and radially inwardly over the intervening trays, means for heating said outer wall, a rotor within said outer wall having, within each stage, a wall forming on its outer face an upwardly-divergent, frusto-conical condensing surface spaced from said vaporizing surface, said condensing surface extending upwardly to a height above the tray of the next higher stage, whereby condensate collected on said condensing surface is, during operation, lifted thereon by centrifugal force and discharged tangentially outwardly over said tray into the said next higher stage, conduit means for introducing material to be distilled, means for removing condensate from an upper stage, means for separately removing unvaporized distilland from a lower stage, and means for evacuating the space between the vaporizing surface and the condensing surface.

4. A high-vacuum, unobstructed path, fractional distillation apparatus having a series of superposed stages comprising a vertical casing, an outer, stationary, downwardly-divergent conical wall in each stage forming a vaporizing surface on the inner face thereof, an annular, substantially horizontal tray joining the top of each of said walls with the bottom of the wall of the next higher stage, an annular weir at the radially inner edge of each tray for distributing liquid, said walls, trays and weirs being arranged to cause distilland to traverse successive stages in sequence by flowing outwardly as a film over successive walls and across successive trays in shallow pools, means for heating said outer wall and trays, a rotor within said outer wall having, within each stage, a wall forming on its outer face an upwardly-divergent, frusto-conical condensing surface spaced from said vaporizing surface, said condensing surface extending to a height a small distance above the weir of the next higher stage, whereby condensate collected on said condensing surface is during operation lifted thereon by centrifugal force and discharged tangentially outwardly over said weir into the next higher stage, conduit means for introducing material to be distilled onto one of said trays, means for removing condensate from an upper tray, means for removing unvaporized distilland from a lower tray, and means for evacuating the space between the vaporizing surface and the condensing surface.

5. A high-vacuum, unobstructed path, fractional distillation apparatus having a series of superposed stages comprising a casing, a plurality of rotatable, upwardly-divergent, frusto-conical walls within said casing forming vaporizing surfaces on the inner faces thereof and providing said stages, means for heating said walls, conduit means for introducing liquid to be distilled onto the inside of one of said vaporizing surfaces so that, during operation, it is caused to flow thereover upwardly by centrifugal force, means for transferring unvaporized distilland from the top of a vaporizing surface onto the bottom of a subsequent, lower vaporizing surface, a plurality of rotatable walls, arranged one within each stage, forming on their outer faces upwardly-divergent, frusto-conical condensing surfaces spaced from said vaporizing surfaces, each of said condensing surfaces extending to a height a small distance above the bottom of the vaporizing surface of the next higher stage, whereby condensate collected on said condensing surface is lifted thereon by centrifugal force and discharged tangentially against the vaporizing surface of said next higher stage, means for removing condensate from an upper stage, means for separately removing unvaporized distilland from a lower stage, and means for evacuating the space between the vaporizing surface and the condensing surface.

6. A high-vacuum, unobstructed path, fractional distillation apparatus comprising a casing, a vertical rotor within said casing supporting a plurality of upwardly-divergent, frusto-conical walls forming vaporizing surfaces on the inner faces thereof and defining a plurality of superposed distillation stages, means for heating said walls, conduit means for introducing liquid to be distilled onto the inside of one of said vaporizing surfaces so that, during operation, it is caused to flow thereover upwardly by centrifugal force, an annular gutter on said casing for each stage located to collect unvaporized distilland from the top of each vaporizing surface, means for transferring distilland from each gutter onto the bottom of the vaporizing surface of the next subsequent, lower stage, a plurality of walls on said rotor forming on their outer faces upwardly-divergent, frusto-conical condensing surfaces spaced from said vaporizing surfaces, each of said condensing surfaces extending to a height a small distance above the bottom of the vaporizing surface of the next higher stage, whereby condensate collected on said condensing surface is lifted thereon by centrifugal force and discharged tangentially against the vaporizing surface of said next higher stage, means for removing condensate from an upper stage, means for separately removing unvaporized distilland from a lower stage, and means for evacuating the space between the vaporizing surface and the condensing surface.

7. A high-vacuum, unobstructed path, fractional distillation apparatus having a series of superposed stages comprising an outer wall forming a vaporizing surface on the inner face thereof, means for heating said wall, a rotor within said outer wall having, within each stage, a wall forming on its outer face an upwardly-divergent, frusto-conical condensing surface spaced from said vaporizing surface, collecting means at the top of each condensing surface for collecting condensate including a downwardly directed annular member, whereby condensate collected on said condensing surface is, during operation, lifted thereon by centrifugal force and introduced into said collecting means, conduit means having a radially inwardly directed face for transferring condensate from said collecting means upwardly by centrifugal force and flow along said face and discharging it against the vaporizing surface near the top of a higher stage, conduit means for introducing material to be distilled onto said vaporizing surface, means for removing condensate from an upper stage, means for separately removing unvaporized distilland from a lower stage, and means for evacuating the space between the vaporizing surface and the condensing surface.

DANIEL B. LUTEN, Jr.

REFERENCES CITED

The following references are of record in the file of this patent:

UNITED STATES PATENTS

| Number | Name | Date |
| --- | --- | --- |
| 1,321,801 | Bausman | Nov. 18, 1914 |
| 1,141,898 | Merritt | June 1, 1915 |
| 1,688,297 | Parent | Oct. 16, 1928 |
| 2,128,223 | Fraser | Aug. 30, 1938 |
| 2,234,166 | Hickman | Mar. 11, 1941 |
| 2,313,175 | Scott | Mar. 9, 1943 |
| 2,446,997 | Brewer et al. | Aug. 17, 1945 |
| 2,406,421 | Wollner et al. | Aug. 27, 1946 |

OTHER REFERENCES

Ayers, "Separation by Centrifugal Force," copyright 1942, by the Sharples Corporation.